United States Patent [19]

Ziemek et al.

[11] Patent Number: 4,570,678
[45] Date of Patent: Feb. 18, 1986

[54] CONDUIT SYSTEM FOR TRANSPORTING LOW TEMPERATURE FLUIDS

[75] Inventors: Gerhard Ziemek, Langenhagen; Klausdieter Schippl, Hannover, both of Fed. Rep. of Germany

[73] Assignee: Kabelmetal Electro GmbH, Hannover, Fed. Rep. of Germany

[21] Appl. No.: 603,166

[22] Filed: Apr. 23, 1984

[30] Foreign Application Priority Data

Apr. 25, 1983 [DE] Fed. Rep. of Germany ....... 3314884

[51] Int. Cl.⁴ .................. F16L 09/18; H01B 07/22
[52] U.S. Cl. .................................... 138/113; 138/114; 138/148; 138/149; 174/28; 174/29
[58] Field of Search ............... 138/111, 113, 114, 148, 138/149; 174/29, 28

[56] References Cited

U.S. PATENT DOCUMENTS

| | | | |
|---|---|---|---|
| 8,994 | 12/1879 | Merriam | 138/114 |
| 2,348,752 | 5/1944 | Quayle | 174/29 X |
| 3,595,275 | 7/1971 | Steans et al. | 138/114 |
| 3,750,058 | 7/1973 | Bankert et al. | 174/29 |
| 3,911,961 | 10/1975 | Peyton et al. | 138/148 X |
| 4,259,990 | 4/1981 | Rohner | 138/113 |

Primary Examiner—James E. Bryant, III
Attorney, Agent, or Firm—Ralf H. Siegemund

[57] ABSTRACT

The conduit system is comprised of a corrugated inner and a corrugated outer tube with a helical spacer in between, the spacer being comprised of intertwined, stranded and/or, braided ceramic fibers.

5 Claims, 3 Drawing Figures

CONDUIT SYSTEM FOR TRANSPORTING LOW TEMPERATURE FLUIDS

BACKGROUND OF THE INVENTION

The present invention relates to the conduction and transport of deep-cooled (cryogenic) fluids, such as liquids or gases, and more particularly the invention relates to a conduit system for the transport of low temperature fluids, including at least two concentrically arranged metal tubes spaced by means of a helical spacer, and wherein the annular space between the two metal tubes is evacuated.

U.S. Pat. No. 4,259,990 discloses a conduit system, including an inner tube and an outer tube with a thermally insulating spacer of helical configuration being disposed between the two tubes, the spacer being comprised of a plurality of braided strand elements forming a single non-tubular coreless braid. The particular strand elements as disclosed in this patent are made of a synthetic material such as polyethylene or polytetrafluoroethylene. This kind of configuration is well suited to thermally isolate the interior of the inner tube from the exterior of the outer tube. It was found, however, that after the gap space between the two tubes has been evacuated, the vacuum begins to deteriorate.

It has been discovered that certain residual gases may emerge from the strand elements and establish a gaseous atmosphere between the two tubes. Even though the pressure remains quite low, a certain deterioration of the thermal insulation between the two tubes becomes inevitable. Moreover, it was found that this particular construction is not suitable for the transport of oxygen because if oxygen for some reason or another enters the gap space, sudden inflammation may occur because these synthetic materials of which the braided spacer is made is likewise inflammable. Moreover, it was found that these particular synthetics are not that insensitive to temperature variations, so that particularly, for example, in the case of a temperature increase over a range in excess of 100 degrees centigrade, the spacer will deform, and a uniform distance in radial direction between the outer and the inner tube is no longer insured.

DESCRIPTION OF THE INVENTION

It is an object of the present invention to improve conduit systems of the type mentioned above to overcome the drawbacks as stated.

It is a particular object of the present invention to provide a new and improved conduit system for the transport of low temperature fluids and being comprised of at least two concentrically arranged metal tubes spaced by means of a helical spacer with a vacuum prevailing between the two tubes, whereby particularly the maintaining of the vacuum is a critical aspect.

It is a feature of the present invention to provide a new and improved spacer for use in concentric tube and conduit systems having very low thermal conductivity being thermally resistant and easy to work with, whereby particularly issuance and evaporation of any gas is to be avoided, i.e., the vacuum between the two concentric tubes is to be maintained, whereby particularly gas issue should be considerably lower than achievable with a conventional synthetic material.

In accordance with a preferred embodiment of the present invention, the objects are attained by utilization of a spacer being comprised of a large plurality of mutually stranded, braided and/or otherwise interwoven or intertwined strands of a ceramic material. A spacer configured as stated can be placed helically upon an inner tube even though the strand elements are made of ceramic. The thermal conductivity is quite comparable with a spacer structure made of conventional synthetics used for that purpose, but gas, if any, is issued from such a spacer at only a very, very low rate. Consequently, remedial evacuation after installation of such a tube system is no longer necessary.

Another advantage of the inventive spacer is to be seen in that the evacuation can be carried out at a much higher temperature, i.e., at a temperature range from 350 to 400 degrees centigrade. This means that any residual molecules of a gaseous nature which for some reason or another are imbedded in the spacer strand elements will readily gather near the surface or right on the surface of the strand elements on account of such a high temperature, and will be readily removed when the space between the two tubes is evacuated. Since the evacuation can be carried out at such a high temperature, the period of evacuation is drastically reduced.

In accordance with a particular advantageous configuration of the invention, it is suggested to strand, braid or otherwise intertwine a plurality of ceramic strand elements for obtaining a particular base bundle, and now several of these bundles are stranded or together. Due to this two or multi-stage stranding, braiding or inter-twining process, one obtains a very flexible construction. Moreover, the dimension of the spacer is easily adaptable through appropriate choice in the number of individual strand elements and/or the number of bundles that are being stranded together at a higher level as stated. This way one can obtain a very precisely matched spacer for the particular situation posed by the particular dimensions of the tubes.

The mechanical stability and strength of that type of spacer is so high that any kind of indent and any kind of displacement of the inner tube within the outer tube is no longer possible. The strands used are preferably very small in diameter, such as from 0.001 mm to 0.1 mm. At such small diameters, ceramic strands are by and in themselves very flexible and bendable so that even after repeated reeling and unreeling, and after processing for purposes of braiding, stranding or otherwise inter-meshing and inter-twining, they will not break. Therefore, the assembly of stranded elements is very strong indeed.

The tubing is preferably comprised of longitudinally welded, corrugated metal tubes. These kinds of tubes can be manufactured in great length and reeled on drums even in a concentric arrangement, whereby the novel spacer is at least as flexible as the corrugated metal tubes themselves. One can obtain long conduits up to about 1,000 feet in single piece configuration. The metal tubes are preferably made of a high grade steel or copper.

DESCRIPTION OF THE DRAWINGS

While the specification concludes with claims, particularly pointing out and distinctly claiming the subjectt matter which is regarded as the invention, it is believed that the invention, the objects and features of the invention, and further objects, features and advantages thereof, will be better understood from the following description taken in connection with the accompanying drawings in which:

Proceeding now to the detailed description of the drawings, FIG. 1 illustrates a corrugated metal tube 1 constituting the inner tube of a conduit system and being accordingly concentrically surrounded by a likewise corrugated outer tube 2. Either of these tubes is preferably made from a high grade stainless steel strip which in a continuous process is folded longitudinally into a split tube configuration, following which the joint is longitudinally welded and the configuration is corrugated subsequently. After these tubes have been made, they are placed one in the other. However, it is preferred to assemble the entire configuration on line and in one continuous process. Particularly certain strip is formed into the inner tube 1, longitudinally welded to close the split tube, whereupon this inner tube is welded. Subsequently the spacer is helically wound onto the inner tube, and now the outer tube is made analagously by folding a wider strip to obtain the outer tube which is likewise longitudinally welded and corrugated.

Figure 1:
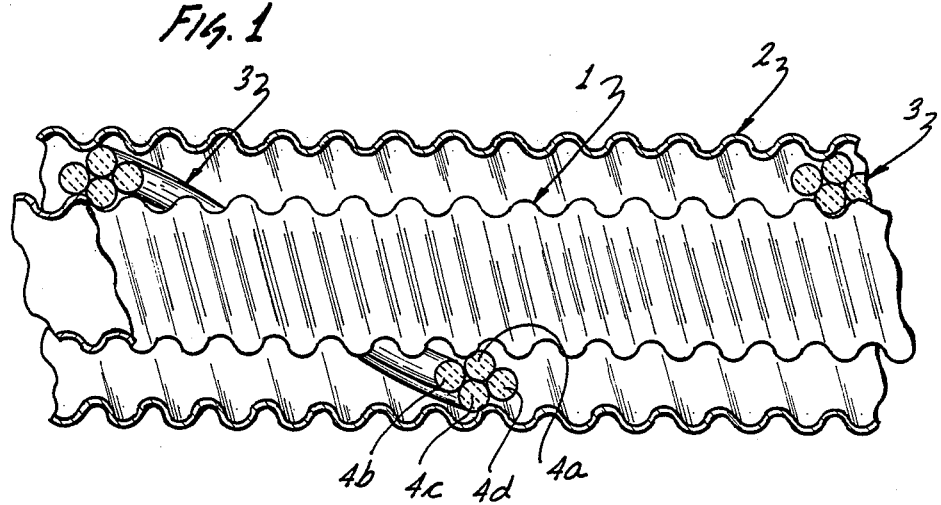
FIG. 1 is a longitudinal section view through a conduit system which includes a spacer configuration in accordance with the preferred embodiment of the present invention.
Figure 2:
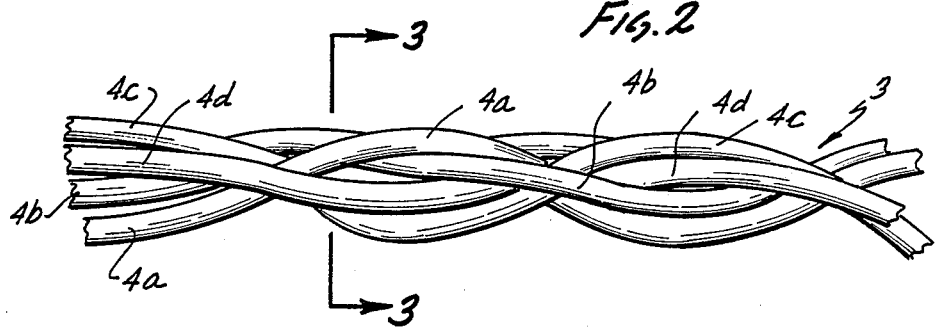
FIG. 2 illustrates on an enlarged scale a spacer configuration used in the tube system of FIG. 1 for practicing the best mode of the present invention.
Figure 3:
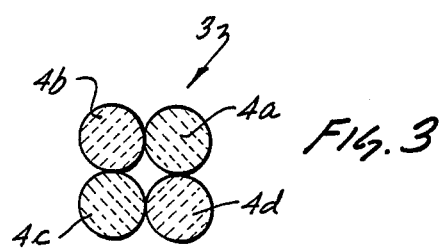
FIG. 3 is a section view as indicated by 33 in FIG. 2.

The spacer that is included between the two tubes provides and establishes a uniform radial spacing between the tubes 1 and 2. After the tubing has been made in this fashion, this gap space between the tubes 1 and 2 is closed, heated and evacuated.

Proceeding now to particulars of the spacer configuration, the spacer 3 is made basically from individual fibers or filaments 5, made of a ceramic material. These fibers are braided, pleated, stranded or otherwise intertwined in order to obtain a certain basic bundle, such as 4a, 4b, 4c and 4d. The fibers each have a diameter in the range from 0.001 mm to 0.1 mm. They are made of ceramic such as—a mixture of aluminium oxide, boron oxide and silicon dioxide. As illustrated, these bundles are stranded or braided together to obtain the spacer 3. This spacer 3 is then wound around the inner tube 1 as stated.

The spacer made in accordance with the invention is significantly advantaged over the known spacers made of a synthetic material. Due to the thinness of the fibers, the flexibility and bendability of the spacer as a whole is the same as in the case of any synthetic. Moreover, this particular spacer is "cleaner" from the point of view of vacuum technology because once installed and once the vacuum has been established, any residual gas will no longer emerge.

While being used in a cryogenic, i.e., low temperature environment, it is very significant that the spacer is highly resistant against high temperature. This permits the generation of the vacuum initially under high-temperature conditions, such as 350 degrees centigrade, or thereabouts.

The metal tubing, as well as the ceramic spacer, will not in the least suffer under these high temperatures, but if the space between the two tubes is heated to such a high temperature prior to evacuation, any residual gas within the fiber configuration will readily be more or less boiled off or caused to evaporate and join the atmosphere that is being reduced through pumping. This means that all residual gas is simply pumped off, and if during the dropping of the pressure in the chamber between the two tubes that high temperature is maintained, then the gas extraction from anywhere is readily enhanced.

Moreover, if the high temperature does in fact reduce the period of time needed for evacuation, all other aspects being similar, the rate of pressure decrease is simply greater, and particularly high vacuum is readily attainable, having therefor removed all potentially parasitic gases from the spacing system as between the two metal tubes, that vacuum will be maintained at the attained level for a considerably longer period of time.

The invention is not limited to the embodiments described above, but all changes and modifications thereof not constituting departures from the spirit and scope of the invention are intended to be included.

We claim:

1. Low temperature conduit system which includes a first inner metal tube and a second outer metal tube concentric to the first inner tube with an evacuated space in between the tubes, a spacer for holding the inner tube concentric to and in the outer tube being comprised of a helical assembly of a large plurality of ceramic filaments or fibers which are intertwined, stranded and/or braided together.

2. A conduit system within claim 1 wherein the fibers or filaments of ceramic material are stranded, intertwined or braided into a plurality of bundles, the plurality of bundles being assembled into a spacer configuration by stranding or braiding.

3. In a conduit system within claim 1 wherein said ceramic fibers have a diameter in the range from 0.001 mm to 0.1 mm.

4. Conduit system as in claim 1 wherein said metal tubes are longitudinally welded and corrugated.

5. Conduit system as in claim 1 wherein said metal tubes are made of high grade steel.

* * * * *